United States Patent [19]
Domer

[11] 3,830,529
[45] Aug. 20, 1974

[54] EXPANSION JOINT FOR PIPES
[75] Inventor: Wolfgang Domer, Nussbaumen, Switzerland
[73] Assignee: BBC Brown, Boveri & Co., Baden, Switzerland
[22] Filed: Sept. 13, 1972
[21] Appl. No.: 288,546

[30] Foreign Application Priority Data
Oct. 13, 1971  Switzerland...................... 14845/71

[52] U.S. Cl...................... 285/45, 285/114, 11/229
[51] Int. Cl............................................. F16l 11/12
[58] Field of Search ............ 285/229, 114, 226, 45, 285/227, 228

[56] References Cited
UNITED STATES PATENTS
1,896,225  2/1933  Dyer..................................... 285/45
2,404,447  7/1946  Marancik et al.................... 285/227

FOREIGN PATENTS OR APPLICATIONS
367,019    3/1963  Switzerland........................ 285/227
1,162,649  2/1964  Germany ........................... 285/114

Primary Examiner—Dave W. Arola
Attorney, Agent, or Firm—Pierce, Scheffler & Parker

[57] ABSTRACT

An expansion joint for pipe systems, such as steam pipe systems, including a leak-proof, pressure resistant, flexible bellows joined to the opposed spaced ends of adjacent substantially co-axial pipes, a tie-rod connected to the ends of the adjacent pipes by means of fixing plates affixed to recesses in the ends of the pipes, said tie rod extending substantially parallel to the axes of the pipes and a cover member affixed to the bellows and to the fixing plates so as to enclose said tie-rod where it extends axially beyond the bellows.

4 Claims, 5 Drawing Figures

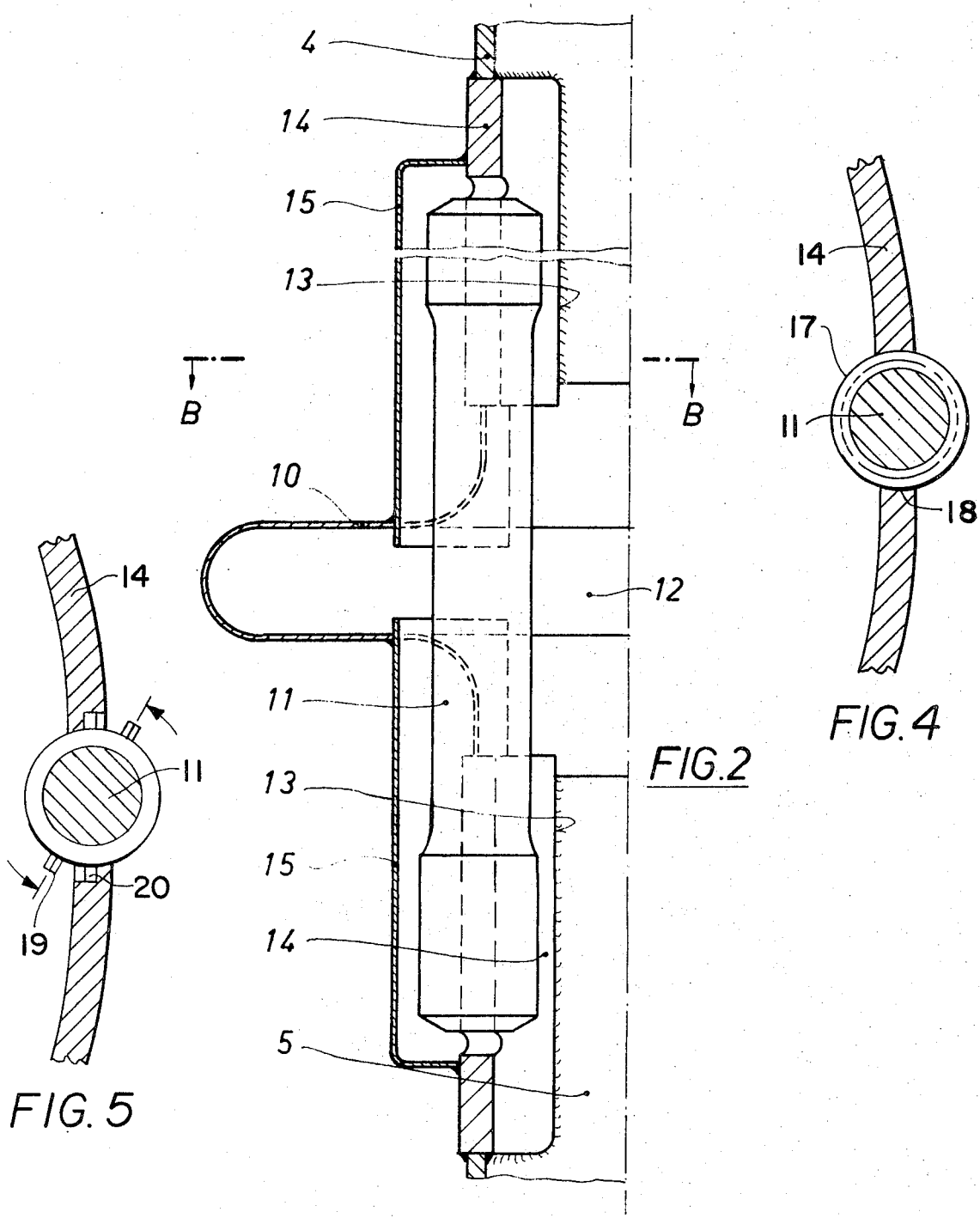

EXPANSION JOINT FOR PIPES

The invention concerns an expansion joint for pipe systems, in particular steam piping, with a leak-proof, pressure-resistant, flexible bellows fixed between the ends of the pipe sections whereby bending forces act on the pipe system.

Pipe expansion joints are known in the form of flexible bellows provided at their rigid ends with tie rods which limit the effect of forces on the bellows. Depending on requirements, these tie rods are jointed at the welding ends of the expansion element, or can be rigidly fixed. The torsional and thrust forces of the pipe system must be diverted around the expansion elements, this being effected either inside or outside the pipe.

In the case of external tie rods, the auxiliary devices for mounting the hinged joints and tie rods require a comparatively large amount of space, and also, additional moments of force arise which must be accommodated by further auxiliary devices. At points on the pipes where an auxiliary device bears on the pipe wall, for example, there occur buckling or creasing forces which necessitate an increase in wall thickness.

With internal tie rods there are no additional moments applied to the pipe walls or pipe system, but on the other hand the free flow cross-section of the pipe is impaired. Account must be taken of the resulting flow losses, even when the pipe diameter is enlarged to compensate the reduction of cross-section area. Here it must be remembered that the forces to be accommodated by the tie rods increase as the square of the diameter. One is therefore inclined to make the diameters relatively small, rather than increase them. Furthermore, the hinged joints and tie rods are exposed to continuous erosions by the flow medium. Such erosion is especially pronounced in steam lines, and in the case of saturated steam can assume dangerous proportions.

The object of the invention is to provide a remedy as regards the space requirement and stressing of the expansion elements, and to create a simpler solution.

This object is achieved in that recesses are provided at the ends of the individual pipe sections, in the almost neutral zone of the pipe system as regards bending stress, axially orientated tie rods being located in these recesses by means of a fixing plate, the bellows enclosing the gap between the pipe sections being joined to the fixing plate by a leak-proof, pressure-resistant, flexible cover.

The advantages of an expansion joint of the invention are that the tie rods are not immediately in the flow cross-section, but at its edge, so that the increase in erosion of the tie rods is greatly reduced, and can almost be disregarded. Moreover, the axial forces in the pipe wall itself are passed on, thus completely eliminating extra torsional moments created by buckling and creasing forces, and necessitating costly auxiliary countermeasures, even though the construction is greatly simplified. Also, the assembly described reduces the space requirement compared with conventional constructions, because the external and internal contour of the pipe is determined solely by the bellows. In addition to the technical advantages, this solution is also much more economical.

The invention is now described in more detail with reference to the drawings, in which:

FIG. 2 is a cross-section on a larger scale viewed at A — A in FIG. 1 and in the direction of the arrows;

FIG. 4 is a fragmentary view similar to FIG. 3 showing a modification, and FIG. 5 is a fragmentary view similar to FIG. 3 showing another modification.

Figure 1:
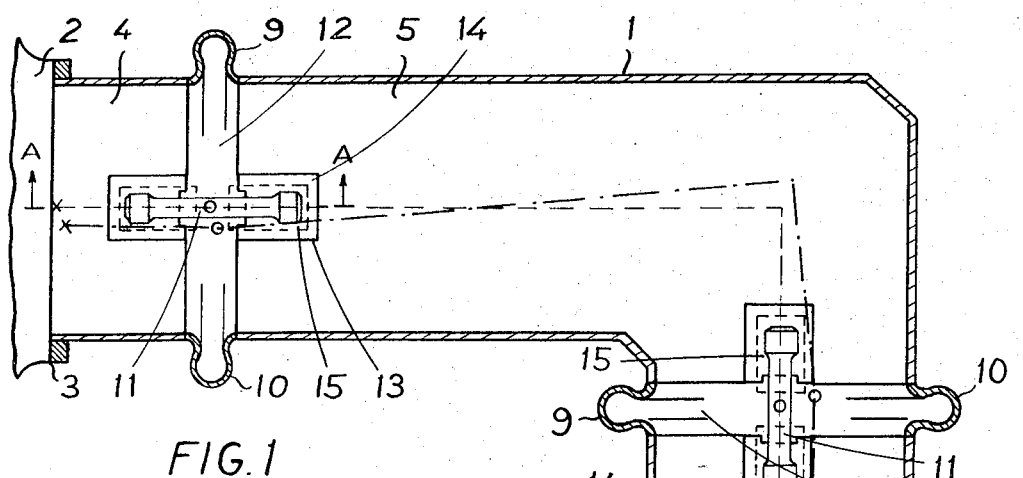
FIG. 1 is a cross-section of a pipe system with a number of expansion joints according to the invention.

FIG. 1 shows a pipe system such as is used, for example, as the crossover pipe on a steam turbine between the intermediate-pressure section and the low-pressure section. In the present case pipe section 4 is connected by means of flange 3 to the intermediate-pressure section 2 of a steam turbine. Expansion joints 9 are located between each of pipe sections 4, 5, 6 and 7. Pipe section 7 has a flange 8 which forms the connection to the low-pressure section 16 of the steam turbine.

Flange 8 of the low-pressure section 16 is taken as the fixed point, while flange 3 of the intermediate-pressure section 2 of the steam turbine moves according to expansion of the section 2. The neutral zone of pipe system 1 in the cold condition, indicated by a broken line, changes during operation, i.e., after heating, to the condition indicated by the chain-dotted line.

The expansion joints 9 comprise essentially a bellows 10 which extends across the gap 12 between pipe sections 4 and 5, 5 and 6, 6 and 7, and is in each case joined to these by welding. The wall of the pipe sections 4 to 7 is provided with recesses 13 in the neutral zone as regards bending stress, these recesses being fitted with a fixing plate 14 which serves both as stiffening for the wall and as a mounting for tie rods 11. Since the fixing plate 14 and the rod 11 penetrate the bellows 10 at least partly, a steamtight flexible cover 15 is welded to the bellows 10 and the fixing plate 14 to form a sealing membrane. Tie rods 11 are located in the neutral zone and thus remain in the same relative position during any displacement due to heating. In the case of complex pipe systems, the axes of which, for example, are not in one plane or have unfavourable angles to each other, this neutral zone must be established beforehand, and the tie rods fitted here.

Figure 3:
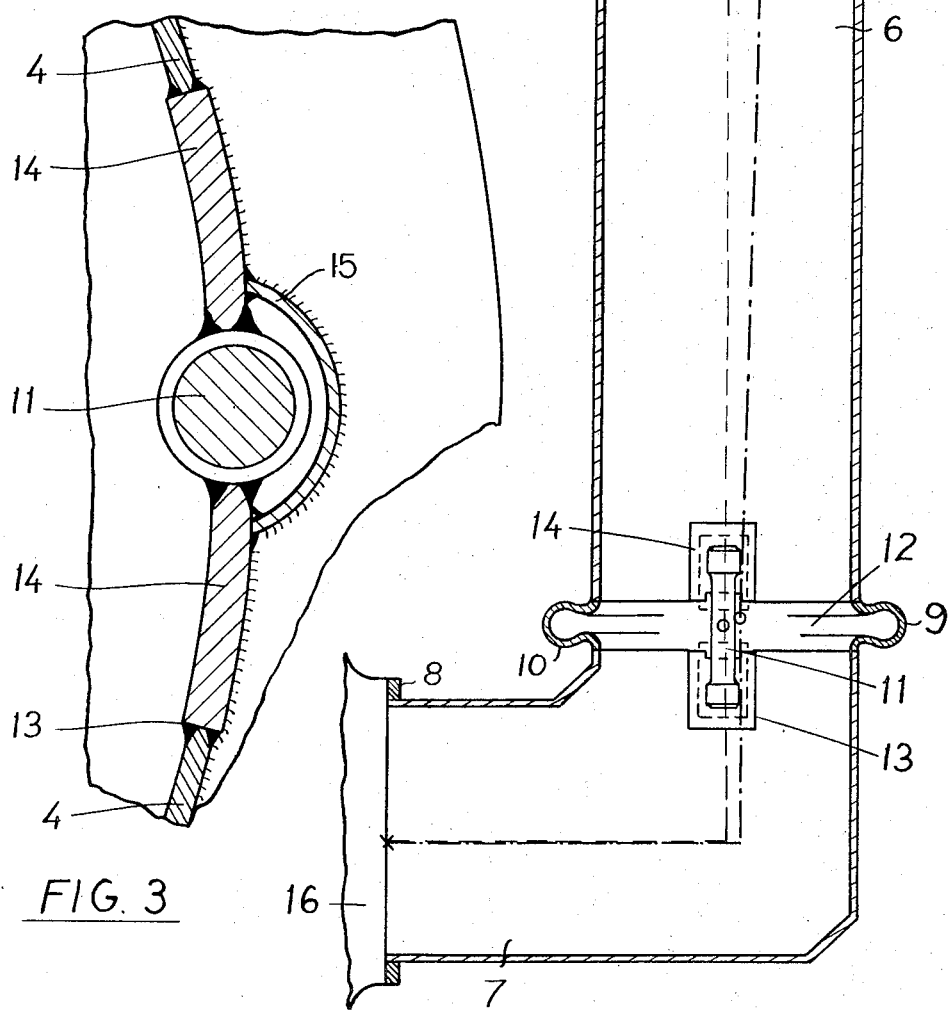
FIG. 3 is a cross-section viewed at B — B in FIG. 2 and in the direction of the arrows.

FIG. 2 shows a longitudinal section through an expansion joint 9, the same reference numbers for the respective parts being used as in FIGS. 1 and 3.

FIG. 3 shows a cross-section through expansion joint 9. The relative thicknesses of the individual parts are here clearly discernible.

The dimensions of tie rod 11, i.e., its minimum body diameter, free bending length, diameter between mountings on fixing plates and overall length of rod, are so matched that the compound bending and tensile stresses do not exceed a predetermined maximum. For this one can choose, for example, the hot long-time creep strength for repetitive stress.

Tie rods 11 can be mounted on fixing plates 14 in a number of ways. The welding technique indicated in the drawings is to be preferred, because it appears that this form of mounting incurs the lowest cost. However, any other form of positive connection, as regards shape and transmission of forces, may be used. In place of the welded connection shown in FIG. 3, a screw connection may be used in which a rod 11 is provided with external threads which engage internal threads 18 along the edges of the fixing plate. Further if desired the connection may be made by means of a bayonet joint as shown in FIG. 5, in which the rod 11 is provided with pins 19 which engage appropriate recess 20 in the fixing plate 14.

I claim:

1. A leak-proof expansion joint for pipe systems subject to variable temperatures comprising pipe members having ends spaced adjacent each other, each pipe member having a curved wall portion, said joint including a leak-prof, pressure resistant, flexible bellows member surrounding and welded to the spaced ends of adjacent pipes, said spaced ends each having an opposed recess extending inwardly in the curved wall of the pipe, a fixing plate secured in each recess and means securing said plates in said recesses, a tie rod extending parallel to the axes of the adjacent pipes when in the normal cool coaxial position, said tie rod having means securing it at each end to the fixing plates secured in the recesses of the adjacent pipe ends, said tie rod and associated fixing plates extending beyond and outside of the lateral boundaries of said bellows member surrounding the exposed portions of said tie rod and having means securing it to said bellows member and to the associated fixing plates.

2. An expansion joint as claimed in claim 1 in which the tie rod securing means is a weld.

3. An expansion joint as claimed in claim 1, in which the tie rod securing means is a screw connection.

4. An expansion joint as claimed in claim 1, in which the tie rod securing means is a bayonet connection.

* * * * *